United States Patent [19]

Stringer et al.

[11] Patent Number: 5,429,217
[45] Date of Patent: Jul. 4, 1995

[54] HYDRAULIC POSITIONER WITH INTEGRAL CONTINUOUSLY ADJUSTABLE STROKE LIMITER

[75] Inventors: Calvin R. Stringer, Saugus; Clyde R. Porter, Los Angeles, both of Calif.

[73] Assignee: P. L. Porter Co., Woodland Hills, Calif.

[21] Appl. No.: 75,107

[22] Filed: Jun. 11, 1993

Related U.S. Application Data

[63] Continuation-in-part of Ser. No. 62,988, May 18, 1993, abandoned, which is a continuation-in-part of Ser. No. 813,292, Dec. 18, 1991, Pat. No. 5,211,379.

[51] Int. Cl.⁶ .............................. F16F 9/32; F16F 5/00
[52] U.S. Cl. .................... 188/300; 188/317; 267/64.12; 92/13.7
[58] Field of Search ...................... 188/300, 317; 267/64.12, 221; 92/13.4, 13.7, 13.8

[56] References Cited

U.S. PATENT DOCUMENTS

| | | | |
|---|---|---|---|
| 3,528,532 | 9/1970 | Moskow | 188/300 |
| 4,155,433 | 5/1979 | Porter | 188/300 |
| 5,005,677 | 4/1991 | Bucholtz et al. | 188/300 X |
| 5,133,245 | 7/1992 | Lee et al. | 92/13.7 X |
| 5,211,379 | 5/1993 | Porter | 188/300 X |

*Primary Examiner*—Robert J. Oberleitner
*Assistant Examiner*—Kevin D. Rutherford
*Attorney, Agent, or Firm*—Beehler & Pavitt

[57] ABSTRACT

A hydraulic positioner of the type having a piston movable in a hydraulic cylinder and a valve actuatable for releasing the piston for movement in the chamber is provided with a continuously adjustable mechanism for limiting the stroke of the piston. The cylinder and the stroke limiter share a common tubular housing which is partitioned to define the hydraulic chamber, thereby simplifying the device.

17 Claims, 4 Drawing Sheets

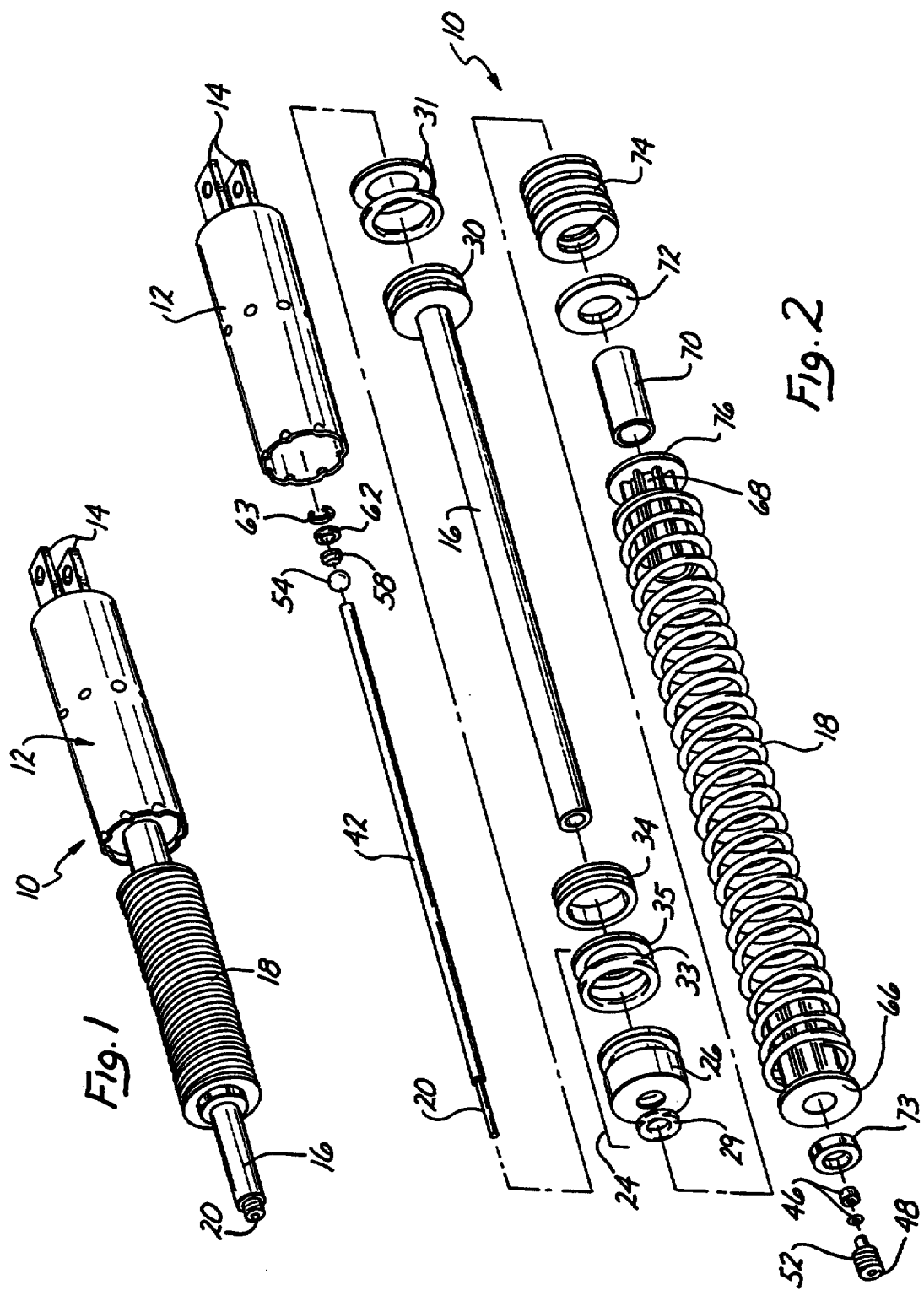

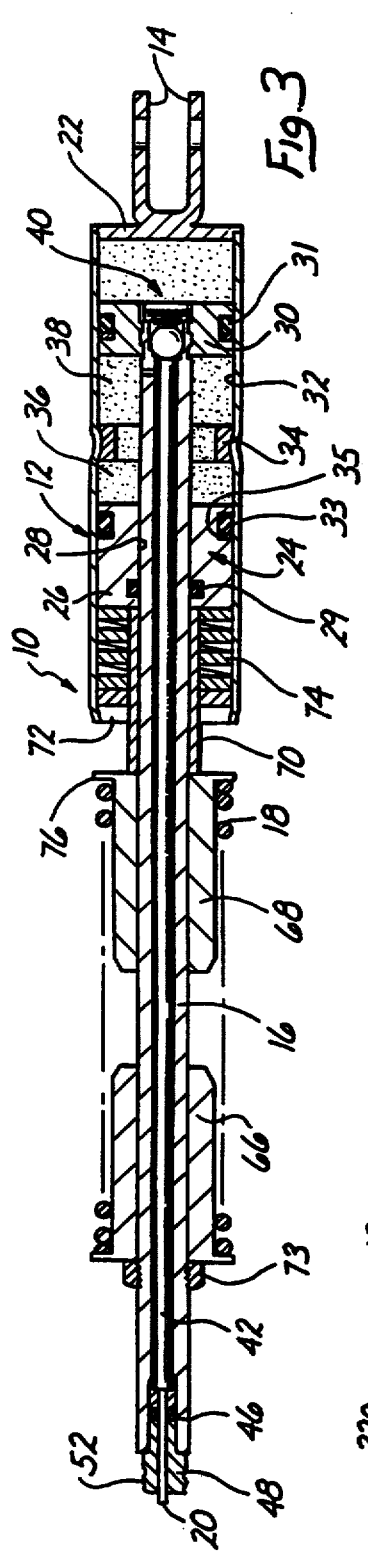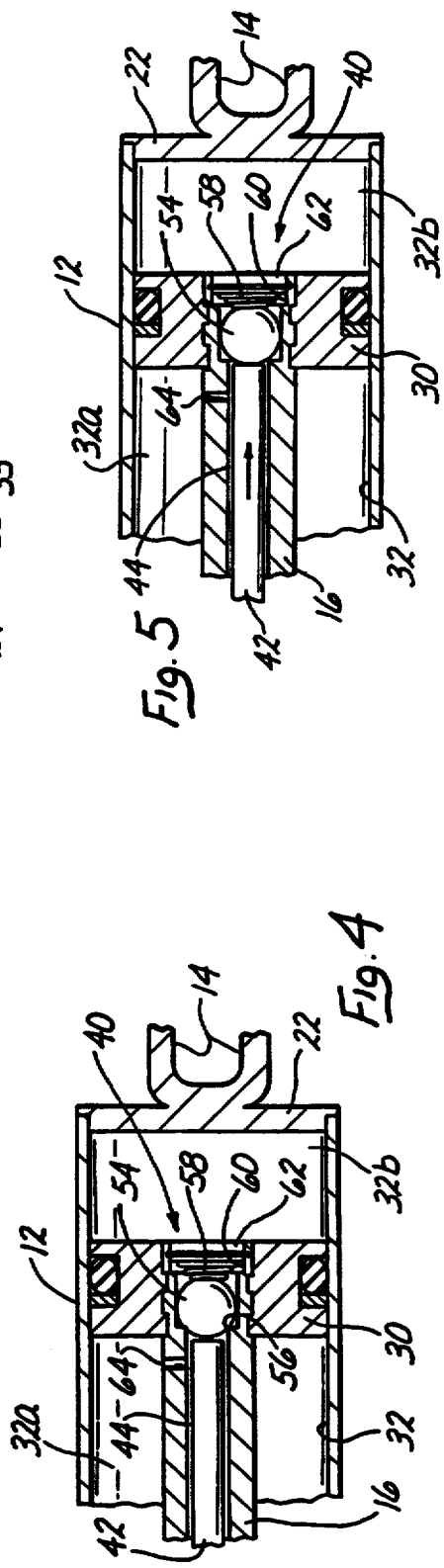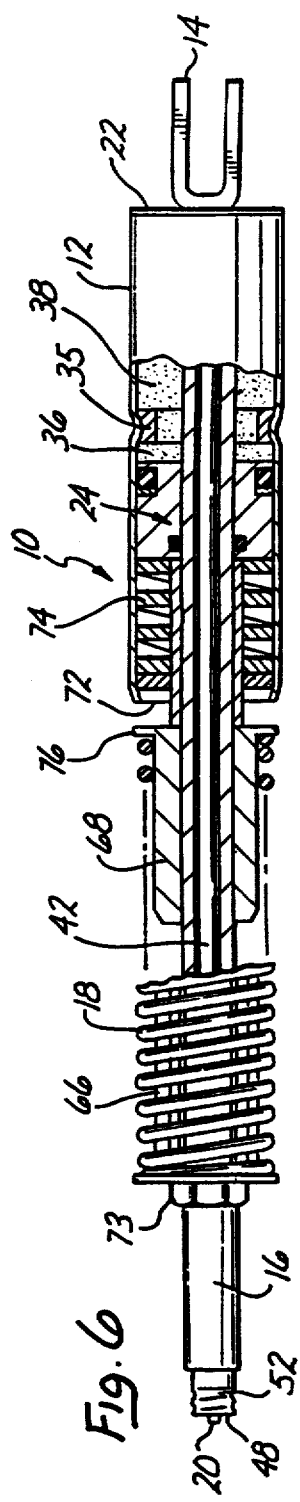

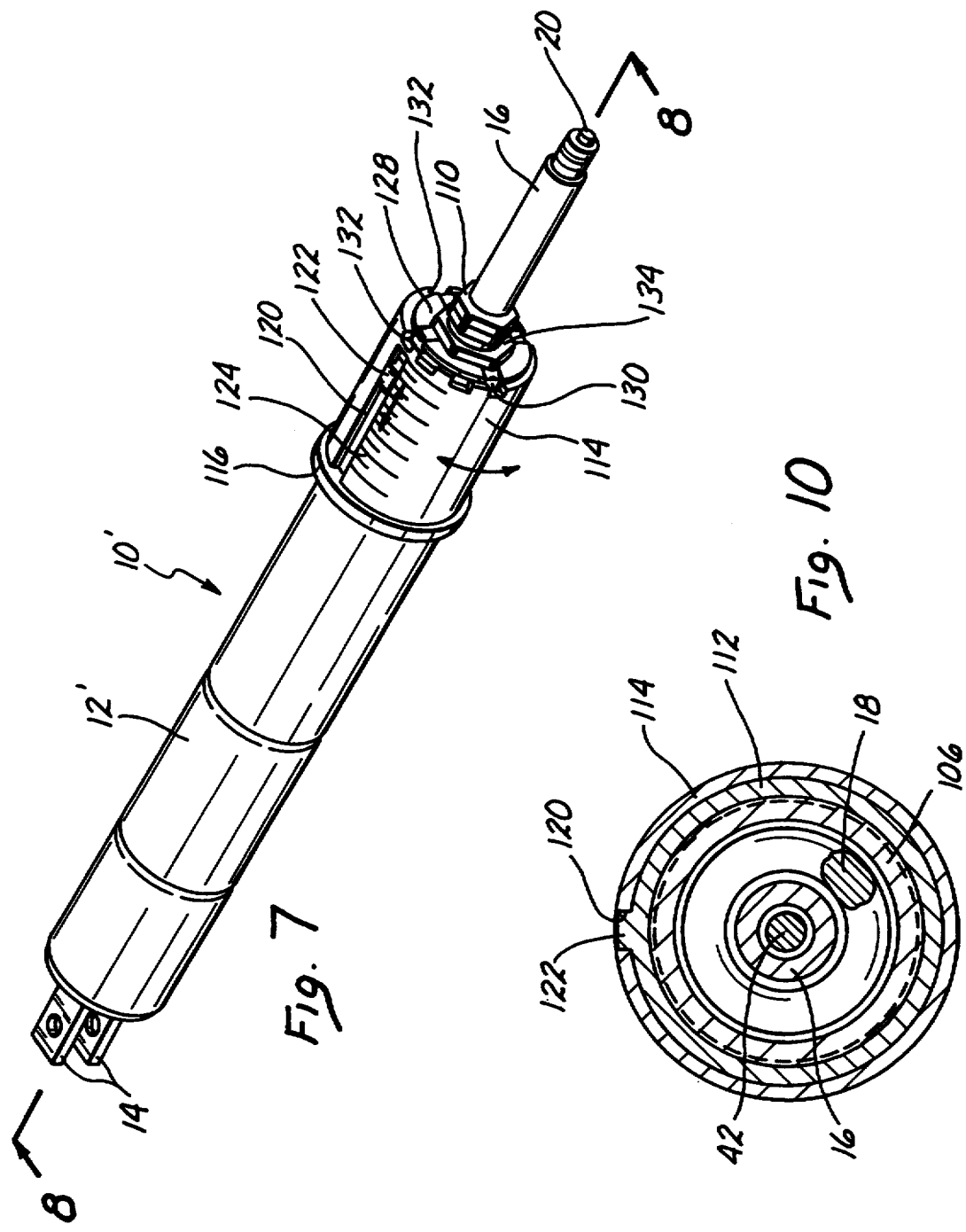

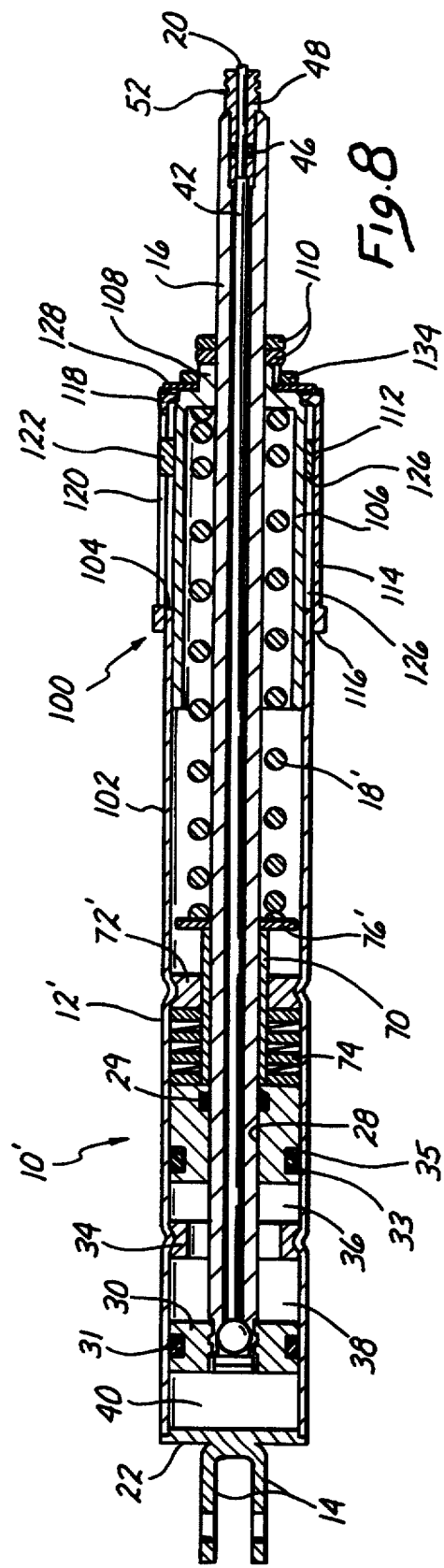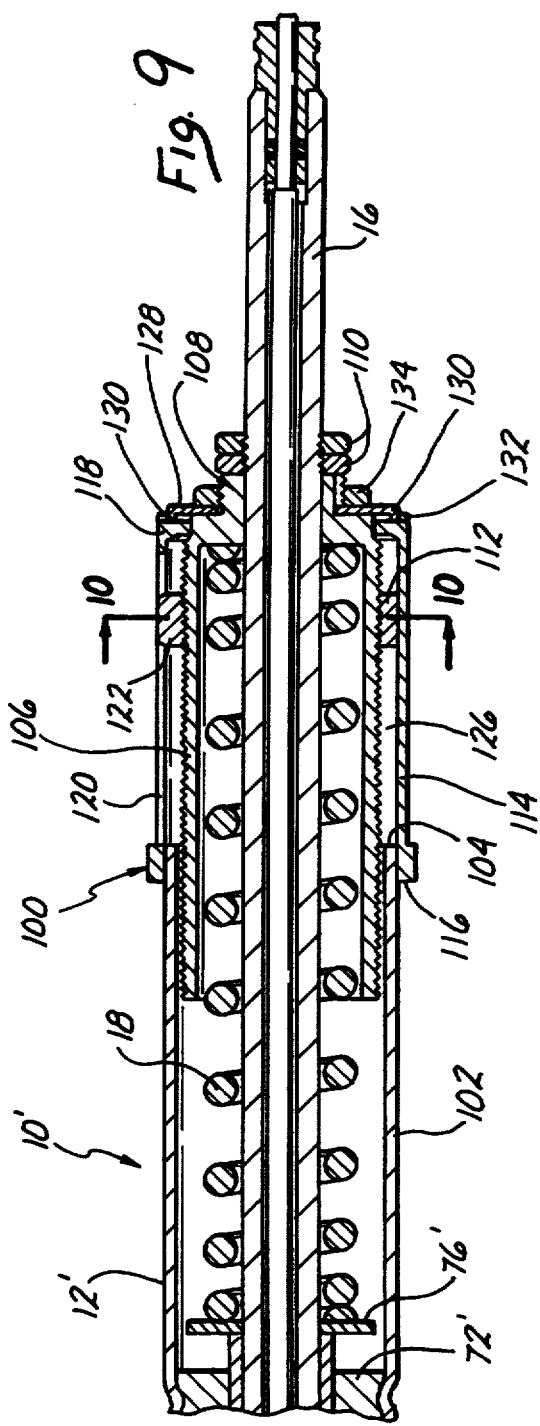

HYDRAULIC POSITIONER WITH INTEGRAL CONTINUOUSLY ADJUSTABLE STROKE LIMITER

This is a continuation-in-part of application Ser. No. 08/062,988 filed on May 18, 1993, now abandoned, which is a continuation of application Ser. No. 07/813,292 filed on Dec. 18, 1991, now issued as U.S. Pat. No. 5,211,379.

BACKGROUND OF THE INVENTION

1. Field of the Invention

The present invention pertains generally to the field of devices used for adjusting the position of the back rest in a recliner seat and more particularly is directed to an improved hydraulic positioner which is continuously self-compensating for variations in hydraulic fluid volume and visually indicates the amount of hydraulic fluid remaining in a reserve space before servicing or replacement of the unit is required.

2. State of the Prior Art

Hydraulic positioners have long been used in recliner seats where the relative position of the back rest can be fixed at a continuously adjustable angle between an upright and a reclined position. Such devices have found particularly wide application in airline passenger seating. The basic hydraulic positioner of this type has a cylinder with a piston chamber filled with a hydraulic fluid, a piston reciprocable in the chamber, and a piston rod fixed to the piston and extending through one end of the cylinder. The cylinder is fixed to the stationary bottom of the recliner seat, while the free end of the piston rod is fixed to the pivotable back rest of the recliner seat. A valve in the piston allows flow of the hydraulic fluid across the piston, but the valve is normally closed, locking the piston in place relative to the cylinder and fixing the back rest at a given position relative to the stationary bottom of the seat. If readjustment of the back rest position is desired, the valve of the hydraulic positioner is opened by means of a release actuator, such as described in U.S. Pat. No. 4,515,034 issued to this applicant, allowing fluid flow across the piston which is now free to move. After the recliner is brought to the new position, the actuating mechanism is released, returning the valve to its normal, closed position, again locking the back rest of the seat.

Existing hydraulic positioners work well and are used successfully in their intended applications, notably passenger aircraft seating. Wider application of these positioners, for example, to ground transport seating, makes desirable certain improvements. In normal use of the positioner hydraulic fluid is gradually lost over the service life of the device. In certain prior art positioners, a reserve volume of fluid is provided for replenishing the amount lost from a reservoir. An example of a prior art hydraulic positioner is described in U.S. Pat. No. 3,860,098, commonly owned with this application, where a bleed hole under a movable seal is exposed only in full extension of the positioner to replenish the piston chamber with fluid from the reservoir. Full extension occurs when the seat back is brought fully upright. To ensure regular replenishment, the seat backs in airliners are pushed to a fully upright condition between flights as part of an interior "dress-up" routine.

Compensation for thermal expansion and contraction of the hydraulic fluid is specially significant in ground transport applications, where hydraulic positioners may be subject to a very wide thermal range, varying with the local climate and the seasons. Contraction of the hydraulic fluid exposed to cold temperatures can create a vacuum space in the piston chamber which in turn allows a degree of free movement to the piston. Conventional hydraulic locks compensate for this condition when the seat back is brought upright. Failure to do so, however, results in a floppy condition of the seat back with the hydraulic positioner locked. It is also desirable to continuously compensate for the change in effective piston chamber volume which occurs as the piston rod moves in and out of the chamber during the stroke of the piston. As the rod is withdrawn, the effective volume of the piston chamber increases by the volume of the rod segment withdrawn from the chamber. This condition can also create a vacuum space in the piston chamber, which unless compensated by replenishment from a reservoir of hydraulic fluid, may likewise creates a floppy condition of the seat back. These characteristics of prior art devices have no significant impact, however, in applications where professional maintenance crews regularly and frequently return the seat backs to a vertical condition, and where the operating temperature range is relatively limited. Owners of private vehicles, on the other hand, cannot be relied upon to return the seat to a fully upright position with any regularity to replenish fluid lost from the piston chamber.

Hydraulic positioners are used in passenger seats on commercial airliners, where the back rest of the passenger seat is movable between a fully upright position and a more comfortable reclining position. The maximum permissible reclining angle of the back rest for a particular seat depends, among other factors, on the spacing between successive seat rows in an aircraft as well as the location of a particular seat within the aircraft. Seats adjacent to an aircraft exit, for example, may require limitation of the maximum depression of the back rest to assure adequate clearance at all times for safe passage. Seats of similar design in a particular aircraft may therefore require different limits to the recliner adjustment depending on the location on a particular seat in the aircraft. Similar considerations may apply to recliner seat installations in other vehicles, such as automotive applications. In the usual installation, an external coil spring of substantial size is mounted coaxially with the cylinder and compressed between the cylinder and rod, biasing the device to an extended position which usually corresponds to a fully upright position of the recliner back rest. The seat occupant repositions the back rest by first actuating the valve to an open position and then pushing backwards on the back rest to drive the rod into the cylinder against the bias of the external spring, then releasing the valve control to its normal, closed position, to lock the seat back rest at the selected new angle. The positioner is consequently adjustable through a stroke of the rod relative to the cylinder, between a fully extended and a retracted condition. In order to limit the maximum angle of depression of the recliner back rest, it is necessary to limit movement of the rod into the cylinder to stop the stroke short of the fully retracted condition otherwise possible in the particular positioner.

In the past, such limitation has called for use of customized mechanical stops in such positioners, dimensioned to meet the requirements of each particular seat installation.

U.S. Pat. No. 5,133,245 commonly owned with this application, discloses a continuously adjustable stroke limiter attachment which can be readily fitted onto hydraulic positioners requiring such a stroke limiter.

It is desirable however, to provide the self-compensating positioner, as well as other hydraulic positioners of this general type, with a continuously adjustable stroke limiter which is integrated with the positioner, rather than a retrofit or optional add-on.

SUMMARY OF THE INVENTION

In response to the aforementioned continuing needs, an improved hydraulic positioner is described herein having a cylinder which defines a piston chamber, a piston reciprocable in the piston chamber, one end of the piston chamber being closed by an axially displaceable seal or gland, a piston rod extending through the gland and connected for movement with the piston between an extended and a compressed condition, hydraulic fluid in the piston chamber, and a valve in the piston actuatable for allowing flow of the hydraulic fluid across the piston in the chamber. The valve is normally closed for locking the piston and the rod against movement relative to the cylinder. An exterior return coil spring biases the piston rod to its extended condition. The hydraulic device has a characteristic override force which, when applied in tension to the piston rod relative to the cylinder, operates to force the valve to an open condition by virtue of the pressure transmitted through the piston to the hydraulic fluid which in turn forces the valve open, allowing fluid flow across the piston without actuation of the valve release mechanism. This feature allows maintenance crews to push the seat back to an upright position without pushing a release button on each seat in an airliner.

In a first improvement, a stop element fixed to the cylinder in the piston chamber limits the stroke of the piston and defines a reservoir space between the stop element and the gland from which the piston is excluded. The reservoir is in communication with the piston chamber at all times and for all positions of the piston and piston rod relative to the cylinder. The moveable gland is continuously urged against the hydraulic fluid in the piston chamber by a second spring, which may be mounted internally to the cylinder but outside the fluid chamber. The force of the external return spring is also applied, through a sleeve coaxial with the internal spring, to the gland and is added to the force of the internal spring, both springs thus cooperating in forcing the gland against the hydraulic fluid in the reserve space. The gland can move axially back and forth in the cylinder between the springs and the fluid to compensate a) for thermal expansion or contraction of the hydraulic fluid, b) for loss of hydraulic fluid during the service life of the device, and c) in response to changes in piston chamber volume as the piston rod moves into and out of the chamber.

The force of the internal spring on the gland is preferably greater than the characteristic override force of the hydraulic positioner. This feature prevents formation of a vacuum in the piston chamber as the rod and piston are pulled towards the extended condition with the valve closed, as when the seat back is pushed upright without actuating the release mechanism of the positioner. The relative forces of the internal spring and the valve are selected such that the valve is forced open before the gland moves against the internal spring as the fluid in the piston chamber is pushed against the gland by the moving piston. Opening of the valve allows the piston to move without displacing the gland.

Yet another benefit of this improvement is that the internal spring assists the return spring in extending the positioner when the valve is opened. This happens because the internal spring pressurizes the hydraulic fluid, which pressure acts on the piston when the valve is open to drive the piston and the piston rod towards extension, in cooperation with the return spring.

In a second improvement, an indicator element exterior to the cylinder is movable with the gland. The spacing between the indicator element and one end of the cylinder provides at-a-glance visual indication of the spacing between the gland and the stop element, which is directly representative of the amount of reserve fluid remaining in the cylinder.

These improvements are advantageous in all current applications of hydraulic positioners, and in particular make the devices better suited to automotive and other similar applications where the unit must be continuously self-compensating without regular attention by maintenance personnel through a wide range of operating conditions. These advantages are achieved in a simple, low cost hydraulic positioner which can advantageously compete with gas spring positioners now in use in automotive application. Gas spring devices have a relative poor service life as the highly compressed gas charge is lost through leakage.

These and other advantages of the present invention will be better understood by reference to the following detailed description of the preferred embodiments, taken together with the attached drawings.

The present invention provides a continuously adjustable stroke limiter which is integral with a hydraulic positioner of the type having a cylinder defining a hydraulic chamber, a piston in the chamber, a piston rod connected to the piston, the piston having a valve actuatable for releasing the piston for reciprocal movement in the chamber, the piston rod being movable with the piston through a stroke between an extended and a compressed condition. The integral stroke limiter includes a threaded inner sleeve mounted axially on the piston rod, a stop ring threaded on the inner sleeve and engageable with the cylinder for stopping compression of the rod into the cylinder, and an outer sleeve rotatable for axially displacing the stop ring along the inner sleeve to a continuously selectable stroke limiting position. The hydraulic positioner has a return spring which continuously biases the rod towards an extended position, the return spring being compressed between the positioner and the inner sleeve.

Preferably, the return spring is contained partly in the cylinder and partly in the inner sleeve. The inner sleeve may have an outer end supported on the rod, and the outer sleeve may be axially fixed to the inner sleeve. The outer sleeve may have an inner end slidably supported on the cylinder, so that the outer sleeve receives one end of the cylinder in telescoping relationship to form a tubular enclosure containing the return spring. In particular, the hydraulic positioner may be the self-compensating hydraulic positioner disclosed in U.S. Pat. No. 5,211,379 issued from this application, where the cylinder is extended over the rod beyond an end closure of the cylinder to provide a stop end of the cylinder engageable with the adjustable stop ring.

These and other improvements, features and advantages of the present invention will be better understood by reference to the following description of the preferred embodiment taken in conjunction with the accompanying drawings.

BRIEF DESCRIPTION OF THE DRAWINGS

FIG. 1 is perspective view of a hydraulic positioner improved according to this invention;

FIG. 2 is an axially exploded perspective view of the hydraulic positioner of FIG. 1;

FIG. 3 is a longitudinal section of the hydraulic positioner of FIG. 1;

FIG. 4 is an enlarged fragmentary view of the ball seat valve, shown in its normal closed condition, of the hydraulic positioner of FIG. 3;

FIG. 5 is a view as in FIG. 4 showing the ball seat valve actuated to its open condition;

FIG. 6 is a longitudinal view of the hydraulic positioner of FIG. 1 shown partly in section and illustrating a relatively depleted condition of the hydraulic fluid reservoir, indicated by a reduced gap between the indicator flange and the cylinder end.

FIG. 7 is a perspective view of the self-compensating hydraulic positioner with integral stroke limiter;

FIG. 8 is a longitudinal cross section taken along line 8—8 in FIG. 7;

FIG. 9 is an enlarged drawing of the stroke limiter portion of the device shown as in FIG. 8;

FIG. 10 is a cross section of the stroke limiter portion taken along line 10—10 in FIG. 9.

DETAILED DESCRIPTION OF THE PREFERRED EMBODIMENT

With reference to the drawings, FIG. 1 shows the hydraulic positioner 10 of this invention, which includes a cylinder 12, a piston rod 16, and a return spring 18. Mounting tabs 14 at the free end of the cylinder are fastened to a movable part of the recliner seat while the free end of the rod 16 is fastened to a stationary part of the seat by suitable mounting hardware. The use of such positioners in recliner seats is known and need not be described here.

Turning to FIG. 3, the cylinder 12 has a fluid tight closed end 22, to which is welded a U shape element defining two mounting tabs 14, which are perforated for receiving a suitable mounting fastener. A seal or gland 24 includes a gland body 26 with an axial bore 28 sized for making a close fit with the outer diameter of the piston rod 16. The gland body 26 is internally and externally grooved for receiving respectively an internal ring seal 29 and two outer seal rings 33, 35, for respectively making a fluid tight seal between the gland body 26 and the piston rod 16, and between the gland body 26 and the wall of cylinder 12. The gland 24 is axially displaceable both relative to the piston rod 16 and the wall of cylinder 12 while maintaining a fluid tight seal with both elements. A piston 30 with piston ring seals 31 is fixed to the inner end of the piston rod 16 and is reciprocable with the rod in a piston chamber 32. A stop ring 34 is swaged to the cylinder 12 in the chamber 32 between the piston 30 and the gland 24 to define a reservoir 36. The ring 34 excludes the piston 30 from the reservoir 36 but is open to permit continuous communication and free flow of hydraulic fluid 38 between the piston chamber 32 and reservoir 36. The piston 30 includes a valve assembly generally indicated by numeral 40, which controls the flow of hydraulic fluid from one side of the piston 30 to the other in the piston chamber 32. The valve 40 is normally closed to prevent flow of hydraulic fluid between the two sides 32a and 32b of the piston chamber, thus locking the piston 30 and piston rod 16 at some selected arbitrary position in the cylinder 12.

Operation of the valve 40 will now be explained with reference to FIGS. 4 and 5. The piston rod 16 is a hollow tube which carries in its interior a push rod 42 with an end section 20 of smaller diameter. The tip of the end section 20 projects from the free end of the piston rod. The diameter of the push rod 42 is substantially smaller than the inside diameter of the piston rod 16 so as to define an interior cylindrical space 44, which is closed near the free end of the piston rod 16 by a compound seal 46. A threaded end piece 48 fitted on the free end of the piston rod 16 has outer groves 52 on which can be mounted an actuating device (not shown) for pushing the projecting tip 20 of the push rod into the piston rod, towards the right in FIGS. 3–5. This actuation of the push rod 42 operates to open the valve 40. The ball valve 40 includes a ball 54 normally urged onto a valve seat 56 by a spring 58 supported in an axial port 60 on a ring 62 secured by expansion ring 63. The axial port 60 is open to allow flow of fluid from side 32b of the piston chamber into the interior cylindrical space 44 of the piston rod. A radial port 64 in the piston rod communicates the space 44 with side 32a of the piston chamber 32. Communication through port 64, space 44, and port 60 is normally closed by the ball 54 on the ball seat 56, a condition illustrated in FIG. 4.

When the push rod 42 is actuated, the inner end of the push rod 42 unseats the ball 54 from the ball seat 56 against the spring 58, as shown in FIG. 5. Displacement of the ball 54 away from the ball seat opens the valve 40 for fluidic communication between sides 32a and 32b of the piston chamber 32. The piston 30 can now move axially along the cylinder 12, between the stop ring 34 and the cylinder end 22.

The piston rod 16 is biased to an extended condition relative to cylinder 12 by the external return spring 18. The coil spring 18 is mounted between two end support fittings 66 and 68. Support fitting 66 is axially fixed against a nut 73 by the force of spring 18, while the other support fitting 68 is forced by spring 18 against a sleeve 70 which passes through a center hole in an end closure 72 of the cylinder 12, and bears against the gland 24, pressing the gland against the hydraulic fluid filling the reservoir 36. An internal coil spring 74 is compressed between the end closure 72 and the gland 24, in the radial space between sleeve 70 and the cylinder 12. The internal spring also presses the gland 24 against the hydraulic fluid in reservoir 36. The forces of the external return spring 18 and the internal spring 74 are therefore combined against the gland 24, urging the gland towards the stop ring 34. In an initial condition of the device, where a reserve supply of hydraulic fluid is contained in a reserve space 36, the gland 24 is held against movement towards the stop ring 34 by the substantially incompressible hydraulic fluid 38. The gland 24 responds to thermal expansion and contraction of the hydraulic fluid by corresponding axial displacement away from or towards the stop ring 34, enlarging and diminishing respectively the combined volume of the reserve space 36 and piston chamber 32 as the hydraulic fluid in both spaces expands and contracts with temperature variations. Likewise, as hydraulic fluid 38 is slowly lost over the service life of the positioner 10, the gland 24 moves towards the stop ring 34, compensating for such loss of fluid and preventing formation of a void space in the piston chamber 32. Finally, the movable gland 24 also compensates for variations in effective volume of the piston chamber 32 as the piston rod 16 moves with the piston 30 between the stop ring 34 and the end closure 22. As the piston rod enters the piston chamber, the volume of the piston rod displaces an equal volume of hydraulic fluid 38 from the chamber 32 and into the reserve space 36. The reservoir 36 is correspondingly enlarged by displacement of the gland 24 away from the stop ring 34. The converse process occurs as the piston rod is withdrawn from the piston chamber 32, resulting in the gland 24 moving towards the stop ring 34 under the combined force of springs 18 and 74.

From the foregoing, it will be appreciated that the hydraulic positioner 10 is continuously self-compensating for thermal expansion/contraction of hydraulic fluid 38, for leakage of fluid 38 from the piston chamber 32, and for changes in piston chamber volume due to movement of the piston rod 16. This compensation occurs as a result of exchange of hydraulic fluid between the reservoir 36 and the piston chamber 32, which are in fluidic communication with each other for any relative position of the piston 30 in the piston chamber 32, under the urging of springs 18 and 74 acting on movable gland 24.

The force of internal spring 74 drives fluid in side 32a of the piston chamber towards side 32b when the valve 40 is open. This has the effect of pressurizing side 32b and driving the piston 30 towards the left in the drawings, thereby extending the piston rod 16 from the cylinder 12. This action of the internal spring 74 assists the action of the external return spring 18 to oppose a load tending to compress the positioner 10 and drive the rod 16 into the cylinder 12.

The piston rod 16 can be released for movement between a compressed condition where the piston rod 16 is retracted into the cylinder 12, and an extended condition of the rod 16, by actuating the push rod 42 which opens the valve 40, as explained above. It is also desirable however, to allow the positioner 10 to be returned to an extended condition in a recliner seat by simply pushing up on the seat back to a vertical position. This feature is a convenience in the dress-up of aircraft interiors, for example, where the crew moves down the aisles and pushes the seat backs upright without having to push the release button for each seat. Positioner 10 has a characteristic override force above which the ball 54 is displaced away from valve seat 56, from the position in FIG. 4 to the open position of FIG. 5, by the force of the hydraulic fluid 38 which is compressed by the piston 30 and forced into port 64 and against ball 54, pushing the ball 54 against the spring 58 with sufficient force to open the valve 40, allowing the piston rod to extend without opening valve 40 if sufficient tensile force, the characteristic override force, is applied to the positioner 10. Since valve 40 is initially closed, the tensile force is transmitted by piston 30 and the fluid 38, pushing the gland 24 against the internal spring 74. Spring 74 is selected to apply a force on gland 24 which is greater than the characteristic override force of the positioner 10. This prevents the override force from pushing the gland 24 and compressing spring 74 before the valve 40 opens, and creating a vacuum in space 32b of the piston chamber 32.

The relative position of the gland 24, and in particular the spacing between the gland 24 and stop ring 34 is indicated by the spacing between the end flange 76 of the movable end support 68 and the end 72 of the cylinder 12. As the gland 24 approaches the stop ring 34 due to loss of hydraulic fluid 38, the end support 68 and sleeve 70 also move with the gland 24 under the urging of return spring 18. The end flange 76 thus approaches the cylinder end 72 as the hydraulic fluid in reservoir 36 is depleted, and provides visual indication of the amount of reserve fluid remaining in the unit, which in turn is indicative of the remaining service life of hydraulic positioner 10. FIG. 6 shows a relatively depleted condition of the fluid in reservoir 36 with consequent displacement of the gland 24 towards the stop ring 34, which displacement is indicated by the reduced gap between indicator flange 76 and cylinder end 72.

With reference to FIGS. 7 through 10, the self-compensating hydraulic lock as described in connection with FIGS. 1 through 6 has been equipped with an integral stroke limiter, generally designated by the numeral 100. Elements designated by primed numerals in FIGS. 7 through 10 correspond to elements designated by like unprimed numerals in FIGS. 1 through 6. The portion of the hydraulic positioner 10' in FIG. 8 to the left of the end seal 72' is structurally and functionally similar to the equivalent portion contained between the end seal 72 and the mounting tabs 14 of the positioner 10 in FIGS. 1 through 6, and the operation of the hydraulic positioners 10 and 10' is the same.

The positioner 10' of FIGS. 1 through 6 has a cylinder 12' which has been extended beyond the end seal 72' by an extension 102 which terminates at a stop end 104 of the cylinder 12'. The spring supports 66, 68 of the earlier described unit 10 have been eliminated, and instead the inner end of return spring 18' now bears against a disc 76 mounted axially adjacent to the sleeve 70 on the piston rod 16. A cylindrical inner sleeve 106 has a closed outer end 108 which supports the sleeve 106 coaxially on the rod 16. The outer end of the return spring 18' bears against the inside of the closed end 108, so that the return spring is compressed between the inner sleeve and the generally the cylinder 12' through the internal spring 74, gland 24 and other hydraulic components of the positioner. The sleeve 106 is held against the force of the return spring 18' by two nuts 110 threaded onto the rod 16. The cylindrical outer surface of the inner sleeve 106 is threaded, and a stop ring 112 is threaded onto the inner sleeve 106. A cylindrical outer sleeve 114 has an open inner end 116 which slides over the end 104 of the cylinder extension 102, in telescoping relationship. The opposite, outer end 118 of the outer sleeve is coaxially mounted onto the closed end 108 of the inner sleeve, and is freely rotatable about the inner sleeve 106. An axial slot 120 in the outer sleeve 14 receives a eadial tab 122 integral with the stop ring 112.

The stroke of the piston rod 16 relative to the cylinder 12' is adjusted by manually turning the outer sleeve 120, which turns the stop ring 112 on the inner sleeve 106 and consequently moves the stop ring axially along the inner sleeve. The outer sleeve 114 may have suitable visual markings, such as graduations 124 indicative of stroke length increments along the slot 120. A particular stroke length is selected by turning the sleeve 114 to bring the stop ring tab 122 into axial alignment with a graduation 124 corresponding to the desired stroke length. The ring 122 has an axial face 126 oriented towards the cylinder 12' which makes stopping engagement with the stop end 104 of the cylinder extension 102, thereby stopping compression of the piston rod 16 into the cylinder 12' and limiting the stroke length of the positioner 10'. The cylinder extension 102 at its stop end 104 is radially supported between the inner sleeve 106 and the outer sleeve 114, and moves axially within an annular space 126 defined between the two sleeves. The radial dimension of the space 126 is such as to make sliding contact between the cylinder extension 102 and both sleeves 106, 114. The telescoping relationship of the cylinder extension 102 with the sleeves 106, 114 provides an enclosure for the return spring 18', considerably enhancing the appearance of the positioner 10' as compared to previous hydraulic positioners where the return spring is external on the piston rod. The positioner 10' has a cleaner, more streamlined exterior appearance as compared to such previous devices.

Since the stroke length of the device 10' normally is set only at installation of the device in a particular recliner seat, or upon installation of the seat at a particular location, it is desirable to prevent accidental or unauthorized readjustment of the stroke length at a subsequent time. For this purpose, a locking ring 128, best seen in FIGS. 7 and 9, has axial fingers 130 which project into indentations 132 defined in the outer end 118 of the outer sleeve 114. The locking ring 128 is normally fixed on the inner sleeve 106 by a locking nut 134 threaded onto the closed outer end 108 of the inner sleeve 106. By tightening the knot 134, the ring 128 is locked against rotation relative to the inner sleeve 106, thereby also locking the outer sleeve 114 against rotation relative to the inner sleeve and fixing the stop ring 112 in position to maintain the desired stroke length setting.

While a particular embodiment of the invention has been described and illustrated for purposes of clarity and example, it must be understood that many changes, substitutions and modifications to the described embodiment will be obvious to those possessed of ordinary skill in the art without thereby departing from the scope and spirit of the invention, which is defined by the following claims

What is claimed is:

1. A hydraulic positioner of the type having a cylinder defining hydraulic chamber means, a piston in said chamber means, a piston rod connected to said piston and extending through a closed end of said chamber means, and valve means actuatable for releasing said piston for movement in said chamber means, said cylinder extending continuously from said closed end to define a tubular extension terminating in a stop end, a threaded inner sleeve axially on said rod, a stop ring threaded on said inner sleeve and engageable by said stop end upon compression of said rod into said cylinder; and an outer sleeve rotatable for axially displacing said stop ring along said inner sleeve to a continuously selectable stroke limiting position, a spring between said cylinder and said inner sleeve for returning said rod to an extended position relative to said cylinder; said spring being partly contained in said extension and partly in said inner sleeve.

2. The positioner of claim 1 wherein an outer end of said inner sleeve is fixed to said rod and said spring bears against said outer end.

3. The positioner of claim 1 wherein said inner sleeve has an outer end supported on said rod and said outer sleeve is axially fixed to said inner sleeve.

4. The positioner of claim 3 wherein said outer sleeve has an inner end slidably supported on said extension.

5. The positioner of claim 4 wherein said inner end of said outer sleeve receives said stop end of said extension.

6. The positioner of claim 1 wherein said outer sleeve and said extension are in telescoping relationship.

7. The positioner of claim 1 wherein said extension is an integral continuation of said cylinder.

8. A hydraulic positioner of the type having a cylinder, a hydraulic chamber in said cylinder, a piston in said chamber, a piston rod connected to said piston and extending axially from said cylinder, valve means actuatable for releasing said piston for movement in said chamber, movable stop means for stopping compression of said rod into said cylinder, an outer sleeve rotatable for axially displacing said stop means to a continuously selectable stroke limiting position, a spring between said cylinder and inner sleeve for returning said rod to an extended position relative to said cylinder, said outer sleeve and an cylinder being in telescoping relationship to form an enclosure containing said spring with said spring at least partly contained in said inner sleeve, one end of said cylinder being radially contained between said inner sleeve and said outer sleeve.

9. The positioner of claim 8 wherein said movable stop means comprise a inner sleeve on said rod and a stop ring threaded onto said inner sleeve and circumferentially engaged to said outer sleeve.

10. A hydraulic positioner of the type having a cylinder, a hydraulic chamber in said cylinder, a piston in said chamber, a piston rod connected to said piston and extending axially from said cylinder, valve means actuatable for releasing said piston for movement in said chamber, an inner sleeve on said rod and a stop ring threaded onto said inner sleeve and circumferentially engaged to said outer sleeve, an outer sleeve rotatable for axially displacing said stop means to a continuously selectable stroke limiting position, a spring between said cylinder and said inner sleeve for returning said rod to an extended position relative to said cylinder, said outer sleeve and said cylinder being in telescoping relationship to form an enclosure containing said spring, said spring being partly contained in said inner sleeve, one end of said cylinder being radially contained between said inner sleeve and said outer sleeve.

11. A hydraulic positioner comprising a cylinder, a piston chamber in said cylinder closed at one end by an axially displaceable gland, a piston axially reciprocable in said first chamber, a rod axially connected to said piston and slidable through said gland, said rod moveable with said piston between an extended and a compressed condition, hydraulic fluid in said piston chamber, valve means in said piston actuatable for allowing flow of said fluid across said piston, said valve means being normally closed for locking said piston and said rod against movement in said cylinder, first spring means urging said rod to said extended condition, said first spring means cooperating with second spring means for jointly urging said gland against said fluid to compensate for changes in fluid volume in said chamber, a threaded inner sleeve axially on said rod, a stop ring threaded on said inner sleeve and engageable by an end of said cylinder upon compression of said rod into said cylinder; and an outer sleeve rotatable for axially displacing said stop ring along said inner sleeve to a continuously selectable stroke limiting position.

12. A hydraulic positioner comprising a cylinder, a piston chamber in said cylinder closed at one end by an axially displaceable gland, a piston axially reciprocable in said first chamber, a rod axially connected to said piston and slidable through said gland, said rod moveable with said piston between an extended and a compressed condition, hydraulic fluid in said piston chamber, valve means in said piston actuatable for allowing flow of said fluid across said piston, said valve means being normally closed for locking said piston and said rod against movement in said cylinder, first spring means urging said rod to said extended condition, second spring means compressed between said cylinder and said gland, movable stop means for stopping compression of said rod into said cylinder, an outer sleeve rotatable for axially displacing said stop means to a continuously selectable stroke limiting position, said outer sleeve and said cylinder being in telescoping relationship to form an enclosure containing said first spring means.

13. The positioner of claim 12 wherein said movable stop means comprise an inner sleeve on said rod and a stop ring threaded onto said inner sleeve and circumferentially engaged to said outer sleeve.

14. The positioner of claim 13 wherein said spring is partly contained in said inner sleeve.

15. The positioner of claim 13 wherein said cylinder has one end radially contained between said inner sleeve and said outer sleeve.

16. A hydraulic positioner of the type having a continuous cylinder, a closure axially fixed at an intermediate point in said cylinder and partitioning said cylinder into a positioner portion and a tubular extension, said extension terminating at a stop end;

said positioner portion including hydraulic chamber means, a piston in said chamber means, a piston rod connected to said piston and extending through said closure and said extension portion, and valve means actuatable for releasing said piston for movement in said chamber means;

movable stop means for stopping compression of said rod into said cylinder upon contact of said stop means with said stop end of said extension, a sleeve axially rotatable on said rod for axially displacing said stop means to a continuously selectable stroke limiting position, a spring partially contained in said extension between said closure and said stop end and bearing against said inner sleeve for returning said rod to an extended position relative to said cylinder.

17. The positioner of claim 16 wherein said sleeve is in telescoping relationship with said extension such that said spring is fully enclosed by said extension and said sleeve in all positions of said rod.

* * * * *